United States Patent
Entner

[15] 3,643,259
[45] Feb. 15, 1972

[54] NAVIGATION SATELLITE SYSTEM EMPLOYING TIME SYNCHRONIZATION

[72] Inventor: Ronald S. Entner, 8148 Lake Park Drive, Alexandria, Va. 22309

[22] Filed: Feb. 20, 1970

[21] Appl. No.: 15,824

[52] U.S. Cl. ............... 343/112 R, 235/150.27, 343/100 ST, 343/112 D
[51] Int. Cl. ........................................... G01s 11/00
[58] Field of Search ............... 343/112 D, 112, 100 ST; 235/150.271, 150.27

[56] References Cited

UNITED STATES PATENTS

| | | | |
|---|---|---|---|
| 3,126,545 | 3/1964 | Smith, Jr. | 343/112 D UX |
| 3,378,842 | 4/1968 | Phillips | 343/112 |
| 3,384,891 | 5/1968 | Anderson | 343/100 ST X |

Primary Examiner—Benjamin A. Borchelt
Assistant Examiner—Richard E. Berger
Attorney—R. S. Sciascia and Thomas O. Watson, Jr.

[57] ABSTRACT

A system to navigate aircraft employing an earth satellite emitting stored signals from its memory device at predetermined times, controlled by a precision clock. The aircraft desiring navigation aid, having an atomic clock synchronized with the satellite's, can thus calculate the propagation delay and the distance travelled by the signal. A computer aboard the aircraft generates a mathematical representation of a sphere, the radius being equal to the distance travelled by the satellite signal. Employing an inertial navigation set linked to the computer, the computer generates two additional spheres, each displaced from the previous sphere by the distance the aircraft travelled prior to receiving the succeeding satellite transmission. The intersection point of the three spheres is the location of the satellite. Knowing the satellite trajectory in advance, the aircraft can thus determine its position with respect to the earth.

7 Claims, 1 Drawing Figure

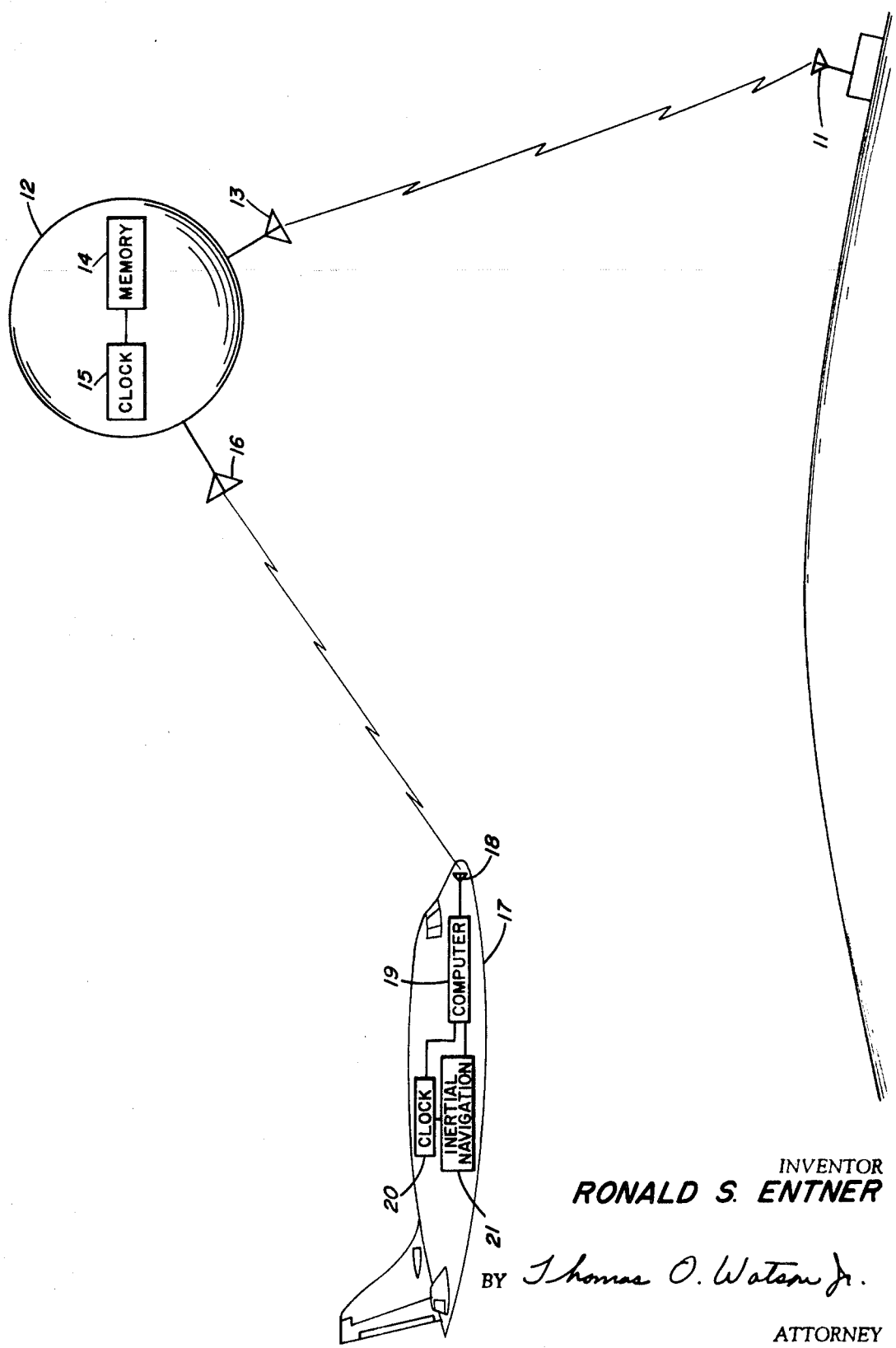
INVENTOR
RONALD S. ENTNER
BY Thomas O. Watson Jr.
ATTORNEY

NAVIGATION SATELLITE SYSTEM EMPLOYING TIME SYNCHRONIZATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to improvements in navigation systems and the like and, more particularly, to new and improved navigation systems utilizing artificial earth satellites whereby the position of aircraft can be determined relative to the satellite and the earth.

Description of the Prior Art

Many means exist today to assist in navigation over the surface of the earth. They range from the compass and map through radio, radar and inertial navigation systems, such as those found aboard high-performance military aircraft. Among the radio navigation systems currently in use are LORAN (Long Range Aid to Navigation), TACAN (Tactical Aid to Navigation) and OMEGA. The effectiveness of these basic radio aid systems has been increased through the addition of inertial platforms and, in the case of aircraft, Doppler radar, which act to preserve the accuracy between radio "fixes." The position accuracy of these integrated systems is, however, never better than the initial fix accuracy of the radio navigation aid. While the transmission and reception of radio position data does not represent an overwhelming problem over short distances and level terrain, the general quality of radio reception deteriorates rapidly with increased distance from the broadcast station and with passage over terrain. For these reasons, earth orbiting transmitters, capable of beaming directly down from space are preferred sources a radio navigation data.

A number of methods and systems for long distance navigation utilizing one or more artificial satellites placed in orbits around the earth may be employed. A range rate measurement technique is one of the known methods for locating the position of the craft (aircraft or surface vessel) with respect to the earth. In the range rate system, the range rate of a satellite relative to the craft having its position located, is determined by measuring the Doppler shift of a continuous wave signal transmitted by the satellite. The Doppler shift is a phenomenon created by a frequency change of the continuous wave signal as observed by the user while receiving the signal for several minutes. There is a unique "Doppler curve" for every point within range of the satellite during its travel above the horizon and the user's position can thus be determined from the curve if the satellite's orbit is known accurately. The major disadvantages of the range rate system are that the computation for determining the user location is complicated and the cost and complexity of computing equipment is high if the location is to be determined in a short time with good accuracy. Other disadvantages are that the time required for satellite observation and position computation as well as the motion of a user aircraft during the period of observation makes the method cumbersome for aircraft use; and extended period of time of satellite observation must be employed in order to obtain sufficient information for position determination if useful accuracy is to be achieved; the cost of user equipment is relatively high even if the burden of position computation is transferred to a ground station computer since some processing of the received signal is necessary by the user; the range rate technique is not well adapted to higher orbits and thus requires a large number of satellites and ground stations if full time, worldwide coverage is to be obtained; communication between users and ground stations requires a relatively large quantity of data to be transmitted from the user if computation is to be performed at the ground stations thereby requiring a more complex communication system.

Another known method for locating the position of a user with respect to the earth is an angle measurement technique either alone or in combination with a range measurement. The angle measurement at the user and/or satellite location requires a precise measurement of the azimuth angle and range, or the azimuth and elevation angles. The disadvantages of the angle measurement technique is that the necessary angle measurement accuracy is obtained with equipment such as precision radar tracking antennas that are very expensive and complex and thus not realistically suitable for user and satellite equipment consideration.

Other known methods require the use of multiple satellites and regular transmission from ground stations to satellites. Such systems are very expensive to maintain the require continuous line of sight between a ground station and satellite.

SUMMARY OF THE INVENTION

Briefly stated, this invention provides a simple yet accurate method and system for supplying navigating information to a subscriber aircraft. A space-borne satellite containing a precise clock, a radio receiver and transmitter, and a data storage medium, is placed in earth orbit. The satellite may or may not have a synchronous orbit. Synchronism would, however, increase satellite availability and, possibly, navigation accuracy. One satellite, only, is required for full system implementation. Depending upon the choice of orbit, synchronous or asynchronous, ground based equipment will measure all or a portion of the satellite's trajectory, compute and predict the satellite's future position as a function of time, and transmit up to the satellite the time and position data computed. The satellite stores this data in bulk storage for retransmission to at intervals derived from the satellite clock. The subscriber aircraft, employing its on board clock synchronized with the satellite clock, would generate a pulse to mark the moment the satellite begins to transmit its position data. Upon receipt of the satellite signal, a second pulse is generated, which is used to compute the signal propagation delay and thence, the distance travelled by the signal. The aircraft computer generates a sphere, the radius equal to the distance travelled by the satellite data transmission at the time of arrival. The aircraft, of course, is located at the center of the sphere with the satellite located somewhere on the sphere's surface. Upon receipt of the next satellite transmission, a second sphere is generated, its centroid displaced from the centroid of the first sphere by the distance travelled by the aircraft in the intervening time. This distance is measured by an accurate inertial navigation set connected to the computer. On receipt of the third transmission, a third sphere is generated in the same manner as the first and second. The set of three equations in three unknowns is then solved to determine the point of intersection of the three spheres, pinpointing the position of the satellite. The position of the aircraft relative to the satellite is now known and its position with respect to the earth can be easily computed.

OBJECTS OF THE INVENTION

It is therefore an object of the invention to provide an accurate and simple method and system for navigation.

Another object of this invention is to provide a new and improved long distance navigation communication method and system employing a single space-borne earth satellite.

A further object of the invention is to develop a method and system for long distance navigation employing synchronized clocks.

Yet another object of the invention is to provide a method of navigation having accuracies which exceed those presently available.

A further object of the invention is to provide a method of navigation having worldwide capabilities and unlimited traffic handling capacity.

A still further object of the invention is to provide a method of navigation that is relatively immune to interferences.

BRIEF DESCRIPTION OF THE DRAWING

The single FIGURE of the drawing is a schematic representation of an operational navigation system based on the instant invention.

DESCRIPTION OF THE PREFERRED EMBODIMENTS

Referring now to the Figure, there is illustrated a ground station 11 which transmits up to satellite 12 the present and future positions of the satellite based on data from tracking radar (not shown) situated near ground station 11. Should the satellite be in a synchronous earth orbit, only one such transmission is necessary, and in the case of an asychronous orbit, an accurate orbit for a long period of time is transmitted to receiver antenna 13 of satellite 11. Satellite 11 contains a data storage memory 14 which stores this transmitted information. Such data storage devices can comprise magnetic disk, drum, tape, core or any similar storage medium. Also on board satellite 11 is a precise clock mechanism 15, e.g., an atomic clock or equivalent that will cause the memory device 14 to transmit, via transmitting antenna 16, the position of the satellite at predetermined intervals. The position of the satellite will consist of its altitude, longitude and latitude in terms of its orbital parameters.

Receiver antenna 18 on subscriber craft 17 receives the transmitted signals and feeds them to computer 19. Atomic clock mechanism 20, which is presynchronized with atomic clock 15 of the satellite, generates a pulse to computer 19 at the same instant clock 15 initiates transmission. Thereupon, computer 19 measures the elapsed time from initiation of transmission of the stored signal aboard satellite 12 until its reception by subscriber aircraft antenna 18. Given this time period the exact range from satellite 12 to subscriber craft 17 is determined, by knowing the velocity of propagation. Airborne computer 19 generates a sphere, with radius equal to the distance travelled by the satellite data transmission at time of arrival, the satellite located somewhere on the sphere's surface, the aircraft located at the centroid of the sphere. Upon receipt of the next satellite transmission, a second sphere is generated, its centroid displaced from the centroid of the first sphere by the distance travelled by the aircraft in the intervening time. This distance is measured by an inertial navigation set 21 connected to both computer 19 and atomic clock 20. On receipt of the third transmission, a third sphere is generated in the same manner as the first and second. The set of three equations in three unknowns is then solved to determine the point of intersection of the three spheres, that point determining the position of the satellite. The position of the aircraft relative to the satellite can easily be computed. It should be noted that the aircraft position thus derived is relative to a virtual, or stationary satellite This scheme permits highly precise navigation relative to a point in space stored in terms of the same relative geometry used to define satellite position. That is, there is inserted into aircraft bulk storage prior to mission initiation, a curve giving destination point position relative to a virtual satellite. It should be noted that for a synchronous satellite, the virtual and real satellite are one and the same, thereby reducing the need for accurate long term position prediction of destination point by correcting for the difference between the aircraft track and the destination point relative to the virtual satellite.

The system of the present invention has been described with a satellite in orbit. It should be emphasized, however, that such a system may be used with missiles or aircraft as well as satellites.

Other alternatives to the disclosed system can include having the satellite contain only the precision clock with the subscriber aircraft storing all the necessary satellite time/position prediction data. Another alternative could include having the satellite contain a digital computer and accelerometers to measure orbital perturbations to upgrade ground based predictions by entering them into a position predictor algorithm that would be solved in the on board digital computer.

Obviously many modifications and variations of the present invention are possible in the light of the above teachings.

What is claimed is:

1. A method for locating the position of a craft comprising the steps of:
    placing a satellite provided with a receiver, transmitter, clock and a memory device into earth orbit;
    transmitting to said satellite receiver the satellite's present and future position;
    storing said transmission in said memory device;
    transmitting said stored transmission at predetermined intervals determined by said clock;
    receiving said satellite transmissions aboard said craft, said craft having a clock synchronized with said satellite clock;
    calculating the distance said transmission covers in the time between the predetermined times of transmissions and its reception by said craft;
    calculating the distance said craft travels between satellite transmissions;
    developing from said satellite transmissions three simultaneous equations based upon the distances the satellite transmissions and craft travelled; and
    simultaneously solving said equations, the solution for said simultaneous equation determining the position of said satellite, whereby the position of said craft may be determined.

2. A navigation system for a craft comprising:
    a space-borne satellite;
    means for transmitting from said satellite the position of said satellite at predetermined intervals;
    means aboard said craft for receiving said transmissions;
    means aboard said craft for calculating the distance said transmission travelled before reception aboard said craft;
    means for determining the distance said craft travels between succeeding transmissions from said satellite; and
    computer means aboard said craft for calculating the position of said craft relative to said satellite based on said calculating means and said determining means.

3. A navigation system as recited in claim 2 wherein said determining means comprises an inertial navigation set.

4. A navigation system as recited in claim 3 wherein said space-borne satellite includes:
    a receiver for receiving information regarding the satellites orbit; and
    a memory device for storing said received information.

5. A navigation system as recited in claim 4 wherein said transmitting means comprises:
    a transmitting antenna; and
    a precision clock for pulsing said stored information for transmission through said transmitting antenna.

6. A navigation system as recited in claim 5 wherein
    said craft includes a precision clock synchronized with said satellite precision clock; and
    said calculating means calculates the distance said transmission covered based on the time elapsed from transmission until reception by said receiving means.

7. A navigation system as recited in claim 6 wherein said computer means generates three spheres on reception of three satellite signals by said craft, said satellite on each sphere's surface, said craft at the centroid of each sphere, the radius of each sphere representing the distance calculated by the calculating means, the distance between centroids of the spheres being determined by said inertial navigation set, the intersection of said three spheres determining the position of said satellite.

* * * * *